(12) United States Patent
Zettler et al.

(10) Patent No.: US 10,511,667 B2
(45) Date of Patent: Dec. 17, 2019

(54) CAR2X COMMUNICATION SYSTEM, APPARATUS AND METHOD

(71) Applicant: Infineon Technologies AG, Neubiberg (DE)

(72) Inventors: Thomas Zettler, Hoehenkirchen-Siegertsbrunn (DE); Bernhard Gstoettenbauer, Engerwitzdorf (AT)

(73) Assignee: Infineon Technologies AG (DE)

( * ) Notice: Subject to any disclaimer, the term of this patent is extended or adjusted under 35 U.S.C. 154(b) by 315 days.

(21) Appl. No.: 15/409,712

(22) Filed: Jan. 19, 2017

(65) Prior Publication Data
US 2017/0214746 A1  Jul. 27, 2017

(30) Foreign Application Priority Data
Jan. 21, 2016  (DE) .................. 10 2016 101 041

(51) Int. Cl.
| | |
|---|---|
| *G01S 7/00* | (2006.01) |
| *G01S 13/32* | (2006.01) |
| *G01S 13/93* | (2006.01) |
| *H04L 29/08* | (2006.01) |
| *H04W 72/12* | (2009.01) |
| *G01S 13/34* | (2006.01) |

(52) U.S. Cl.
CPC .............. *H04L 67/12* (2013.01); *G01S 7/006* (2013.01); *G01S 13/32* (2013.01); *G01S 13/931* (2013.01); *H04W 72/12* (2013.01); *G01S 13/343* (2013.01); *G01S 13/345* (2013.01); *G01S 2013/936* (2013.01); *G01S 2013/9364* (2013.01); *G01S 2013/9367* (2013.01); *G01S 2013/9378* (2013.01)

(58) Field of Classification Search
CPC ...... G01S 13/32; G01S 13/343; G01S 13/345; G01S 13/931; G01S 2013/936; G01S 2013/9364; G01S 2013/9367; G01S 2013/9378; G01S 7/006; H04L 67/12; H04W 72/12
USPC .......................................... 342/58
See application file for complete search history.

(56) References Cited

U.S. PATENT DOCUMENTS

| | | | |
|---|---|---|---|
| 5,654,715 A * | 8/1997 | Hayashikura | G01S 13/87 342/70 |
| 5,917,430 A | 6/1999 | Greneker et al. | |
| 7,315,239 B2 | 1/2008 | Cheng et al. | |

(Continued)

OTHER PUBLICATIONS

Wikipedia, "Dauerstrichradar", available at: https://de.wikipedia.org/w/index.php?title=Dauerstrichradar&olddid=149988725, accessed Jan. 9, 2016, pp. 1-12.

*Primary Examiner* — Timothy X Pham
(74) *Attorney, Agent, or Firm* — Design IP

(57) ABSTRACT

Apparatuses, systems and methods for communicating between a first device and a second device are provided. Distance control circuitry including at least one transceiver is used to transmit and receive distance control signals and to detect a distance between the first device and a remote object based on a transmitted distance control signal and a received distance control signal reflected by the remote object. Communication circuitry coupled to the transceiver is used to modulate user data of the first device onto a transmitted distance control signal and/or to extract user data from a distance control signal received from the second device.

19 Claims, 4 Drawing Sheets

(56) References Cited

U.S. PATENT DOCUMENTS

| | | | |
|---|---|---|---|
| 8,068,051 B1 | 11/2011 | Osterwell | |
| 2001/0015692 A1* | 8/2001 | Takanori | G07C 9/00309 |
| | | | 340/5.23 |
| 2003/0102997 A1 | 6/2003 | Levin et al. | |
| 2004/0047425 A1* | 3/2004 | Itoh | H04L 1/0001 |
| | | | 375/259 |
| 2007/0164896 A1 | 7/2007 | Suzuki et al. | |
| 2007/0279199 A1* | 12/2007 | Danz | B60Q 9/006 |
| | | | 340/435 |
| 2013/0116861 A1* | 5/2013 | Nemoto | B60W 30/16 |
| | | | 701/2 |
| 2014/0022108 A1* | 1/2014 | Alberth, Jr. | G01S 13/04 |
| | | | 342/52 |
| 2014/0148998 A1* | 5/2014 | Goudy | G08G 1/163 |
| | | | 701/41 |
| 2016/0124075 A1* | 5/2016 | Vogt | G01S 7/023 |
| | | | 342/13 |
| 2016/0280132 A1* | 9/2016 | Palanimuthu | B60Q 9/008 |

* cited by examiner

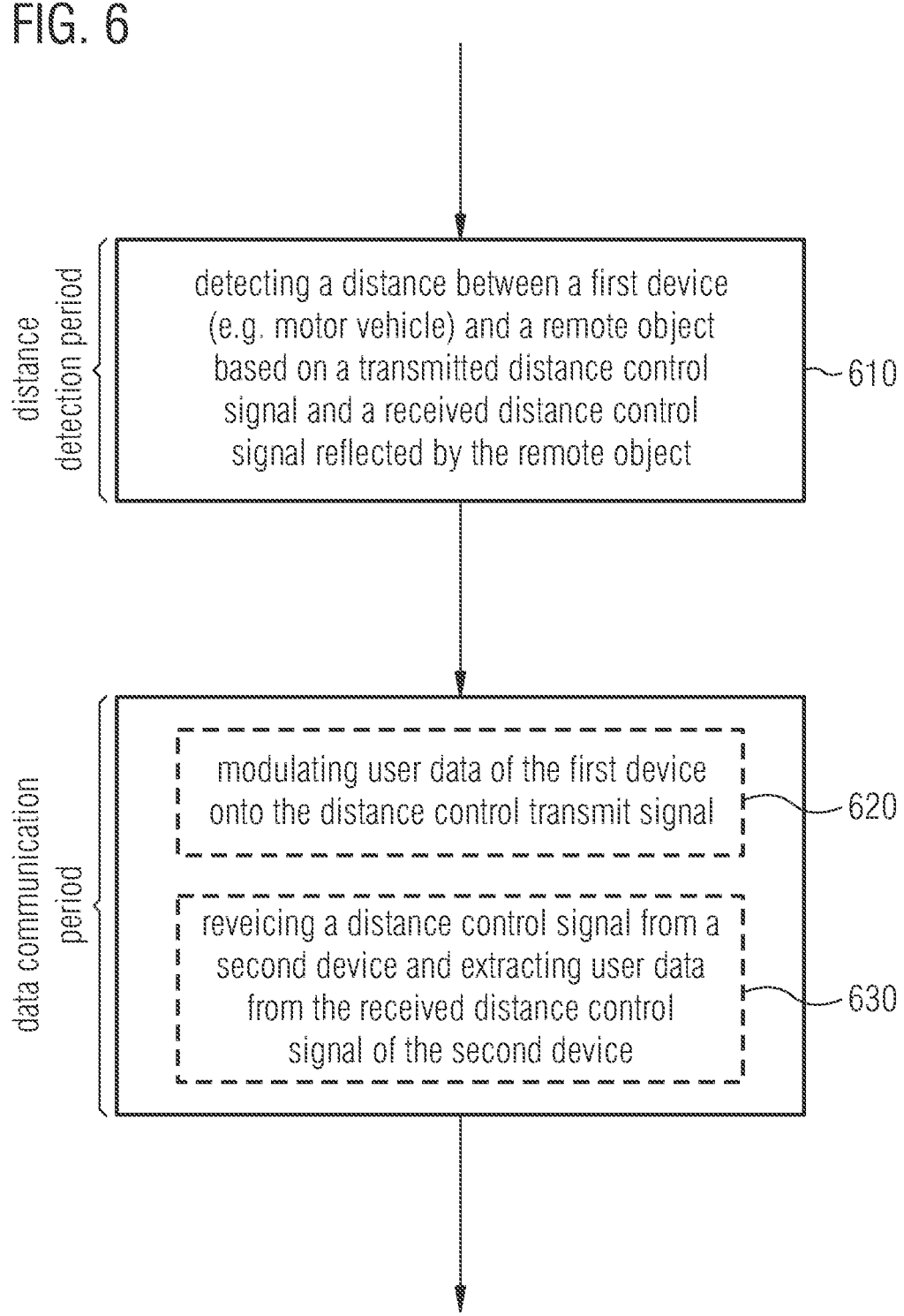

CAR2X COMMUNICATION SYSTEM, APPARATUS AND METHOD

FIELD

Embodiments of the present disclosure generally relate to communication systems and, more particularly, to so-called "Car2X" communication systems.

BACKGROUND

In order to increase road safety using autonomous driver assistance systems or when aiming at (partially) autonomous driving, motor vehicles may rely on so-called "Car2X" communication. For example, "Car2X" communication may refer to data exchange between a host vehicle and one or more other vehicles or to data exchange between the host vehicle and other roadside units. This data exchange may require additional devices for wireless communication (additional hardware), thus causing additional costs.

Some conventional "Car2X" communication concepts employ mobile communication systems, which can be divided into systems with stationary infrastructure (networks), such as cellular systems like the Global System for Mobile communication (GSM), Universal Mobile Telecommunications System (UMTS), or Long-Term Evolution (LTE), for example. Other mobile communication systems do not require stationary infrastructure since they may employ direct point-to-point connections, such as, for example, Bluetooth, Wireless Local Area Network (WLAN) in ad-hoc mode, optical methods, etc. Yet further conventional Car2X communication examples may employ broadcasting messages.

The mentioned examples all have in common that additional hardware for wireless communication is required. Further, Car2X communication concepts using stationary or cellular networks may not be available in remote rural areas. It is therefore desirable to resort to existing hardware (hardware already available for other functions) for Car2X communication in a vehicle.

SUMMARY

Embodiments of the present disclosure propose to employ existing distance control hardware for the purpose of Car2X communication. Distance control hardware may be used for several different purposes in modern motor vehicles. For example, distance control functionalities may be used for park distance control. Here, parking or proximity sensors for road vehicles are used to alert the driver to obstacles while parking. These systems commonly use either electromagnetic or ultrasonic sensors. For another example, a blind spot monitor may be available to detect other vehicles located to the driver's side and rear. Other examples of distance control systems can be used for providing at least partially autonomous driving capabilities. For example, laser-based or radar-based Autonomous Cruise Control (ACC) systems can be used for road vehicles that automatically adjust the vehicle speed to maintain a safe distance from vehicles ahead.

Embodiments propose to expand or extend such distance control systems with respect to Car2X communication functionalities.

According to a first aspect of the present disclosure, it is provided an apparatus for communicating between a first device (e.g., a motor vehicle) and a second device. The apparatus comprises distance control circuitry including at least one transceiver configured to transmit and receive distance control signals and to detect a distance between the first device and a remote object based on a transmitted distance control signal and a received distance control signal reflected by the remote object. The apparatus further comprises communication circuitry coupled to the transceiver and configured to modulate user data of the first device onto a transmitted distance control signal and/or to extract (or demodulate) user data from a distance control signal received from the second device.

For the purpose of the present disclosure, the distance control circuitry's transceiver may be regarded as a device comprising functionalities of both a transmitter and a receiver. In some embodiments, the transmitter and receiver may be combined and may share common circuitry or a single housing. In other embodiments, the transmitter and receiver may be implemented on separate circuitries and/or in separate housings.

In some embodiments, the transceiver may be a transceiver for Radio Frequency (RF) signals. In other embodiments, the transceiver may be a transceiver for light signals, such as laser signals, for example. Yet in other embodiments, the transceiver may be a transceiver for ultrasonic signals.

In some embodiments, the user data may be regarded as payload data or information bearing data. That is to say, user data may be regarded as a part of transmitted data which is the purpose of the transmission. In some embodiments, the user data may be Forward Error Correction (FEC) encoded user data.

In some embodiments, the distance control circuitry may be configured to detect the distance during a distance detection period. The communication circuitry may be configured to modulate and/or extract the user data during a data communication period.

In some embodiments, the distance detection period and the data communication period may be non-overlapping time periods.

In some embodiments, the data communication period may comprise a data transmission period and a data reception period. The transmitter portion of the transceiver may be active during the data transmission period, while the receiver portion of the transceiver may be active during the data reception period.

In some embodiments, the data transmission period and the data reception period may be non-overlapping time periods.

In some embodiments, the data communication period may be arranged between subsequent distance detection periods.

In some embodiments, the communication circuitry may be configured to communicate with the (remote) second device in accordance with a predefined multiple access method. Some examples for multiple access methods are Time Division Multiple Access (TDMA) allowing several users to share the same frequency resource by dividing it into multiple time slots, Frequency Division Multiple Access (FDMA) allowing several users to share the same time resource by dividing it into multiple time frequency channels, or Code Division Multiple Access (CDMA) allowing several users to share the time and/or frequency resources by using multiple different signal codes.

In some embodiments, the transceiver may be configured to transmit the distance control signal as a single carrier signal. Thus, distance/speed measurement as well as data communication may be performed based on a distance control signal employing only one carrier frequency at a given time instant.

In some embodiments, the distance control circuitry may be configured to use wireless distance control signals. They may be chosen from the group of radar signals (RAdio Detection And Ranging (RADAR)), lidar signals (LIght Detection And Ranging (LIDAR)), and ultrasonic signals. In particular, the transceiver may be configured as Frequency Modulated Continuous Wave (FMCW) radar transceiver to use FMCW radar signals as the distance control signals.

In some embodiments, the communication circuitry may be configured to modulate a phase and/or amplitude of the transmitted distance control signal based on the user data and/or to demodulate the phase and/or amplitude of the received distance control signal to extract the user data.

In some embodiments, the communication circuitry may be configured to modulate the user data onto the transmitted distance control signal during a data communication period between subsequent Frequency Modulated Continuous Wave (FMCW) frequency ramps of the transmitted distance control signal (which is a FMCW radar signal in those embodiments). Additionally or alternatively, the communication circuitry may be configured to extract the user data from the distance control signal received from the remote device during a data communication period between subsequent FMCW frequency ramps of the received distance control signal.

In some embodiments, the transceiver may be configured to transmit and/or receive the distance control signal with a constant predefined frequency during the communication period. Here, the term 'predefined' may refer to some sort of agreement on the frequency to enable proper communication.

In some embodiments, the motor vehicle may further comprise an antenna array coupled to the at least one transceiver for directional signal transmission or reception. Using multiple antenna elements together with appropriate analog and/or digital signal processing may be used to achieve spatial selectivity or directionality of the array. In some embodiments, even multiple spatially separated wireless communication channels may be generated.

According to a further aspect of the present disclosure, it is provided a motor vehicle. The motor vehicle comprises distance control circuitry including at least one transceiver. The distance control circuitry is configured to transmit and receive distance control signals and to detect a distance between the motor vehicle and a remote object based on a transmitted distance control signal and a received distance control signal reflected by the remote object. The motor vehicle further comprises communication circuitry coupled to the transceiver and configured to modulate user data onto a transmitted distance control signal and/or to extract user data from a distance control signal received from a remote device.

In some embodiments, the motor vehicle may be regarded as a self-propelled road vehicle. Vehicle propulsion may be provided by an engine or motor, usually by an internal combustion engine, or an electric motor, or some combination of the two, such as hybrid electric vehicles and plug-in hybrids. Motor vehicles may be identified within a number of vehicle classes including cars, buses, motorcycles, off-road vehicles, light trucks and regular trucks.

In some embodiments, the motor vehicle can comprise distance control circuitry with at least one transceiver configured to transmit and receive FMCW radar signals as distance control signals and to detect a distance between the motor vehicle and a remote object based on a transmitted distance control signal and a received distance control signal reflected by the remote object. The motor vehicle can further comprise communication circuitry coupled to the transceiver and configured to modulate user data onto a transmitted distance control signal during a data communication period between subsequent FMCW ramps of the transmitted distance control signal, and/or configured to extract user data from a distance control signal received from a remote device during a data communication period between subsequent FMCW ramps of the received distance control signal.

In some embodiments, the transceiver may be configured to transmit and/or receive the distance control signal with a constant predefined frequency during the communication period. The distance control signal with the constant predefined frequency may be phase and/or amplitude modulated in accordance with the user data.

According to yet a further aspect of the present disclosure a method is provided suitable for Car2X communication. The skilled person having benefit from the present disclosure will appreciate that the method is not limited to Car2X communication but also applicable to other communication scenarios. The method includes, during a distance detection period, detecting a distance between a first device (e.g. a motor vehicle) and a remote object based on a distance control transmit signal and a distance control receive signal reflected by the remote object. Further, the method includes, during a data communication period, modulating user data onto the distance control transmit signal and/or receiving a distance control transmit signal from a (remote) second device, and extracting user data from the received distance control transmit signal of the second device.

In some embodiments, detecting the distance includes using a FMCW radar signal as distance control transmit signal.

In some embodiments, modulating includes modulating the user data onto the distance control transmit signal during a data transmission period between subsequent FMCW frequency ramps of the distance control transmit signal. Additionally or alternatively, extracting may include extracting the user data from the distance control transmit signal received from the remote device during a data reception period between subsequent FMCW frequency ramps of the received distance control transmit signal.

In some embodiments, the method may further include transmitting and/or receiving the distance control transmit signal with a constant predefined frequency. The distance control transmit signal with a constant predefined frequency may act as a carrier signal for the user data.

Embodiments of the present disclosure may be used for implementing Car2X communication on the basis of existing distance control systems, thus avoiding additional dedicated hardware for wireless communication.

BRIEF DESCRIPTION OF THE DRAWINGS

Some embodiments of apparatuses and/or methods will be described in the following by way of example only, and with reference to the accompanying figures, in which

FIG. 6 shows a flowchart of an example method for communicating between a first device and a second device.

DETAILED DESCRIPTION

Figure 1:
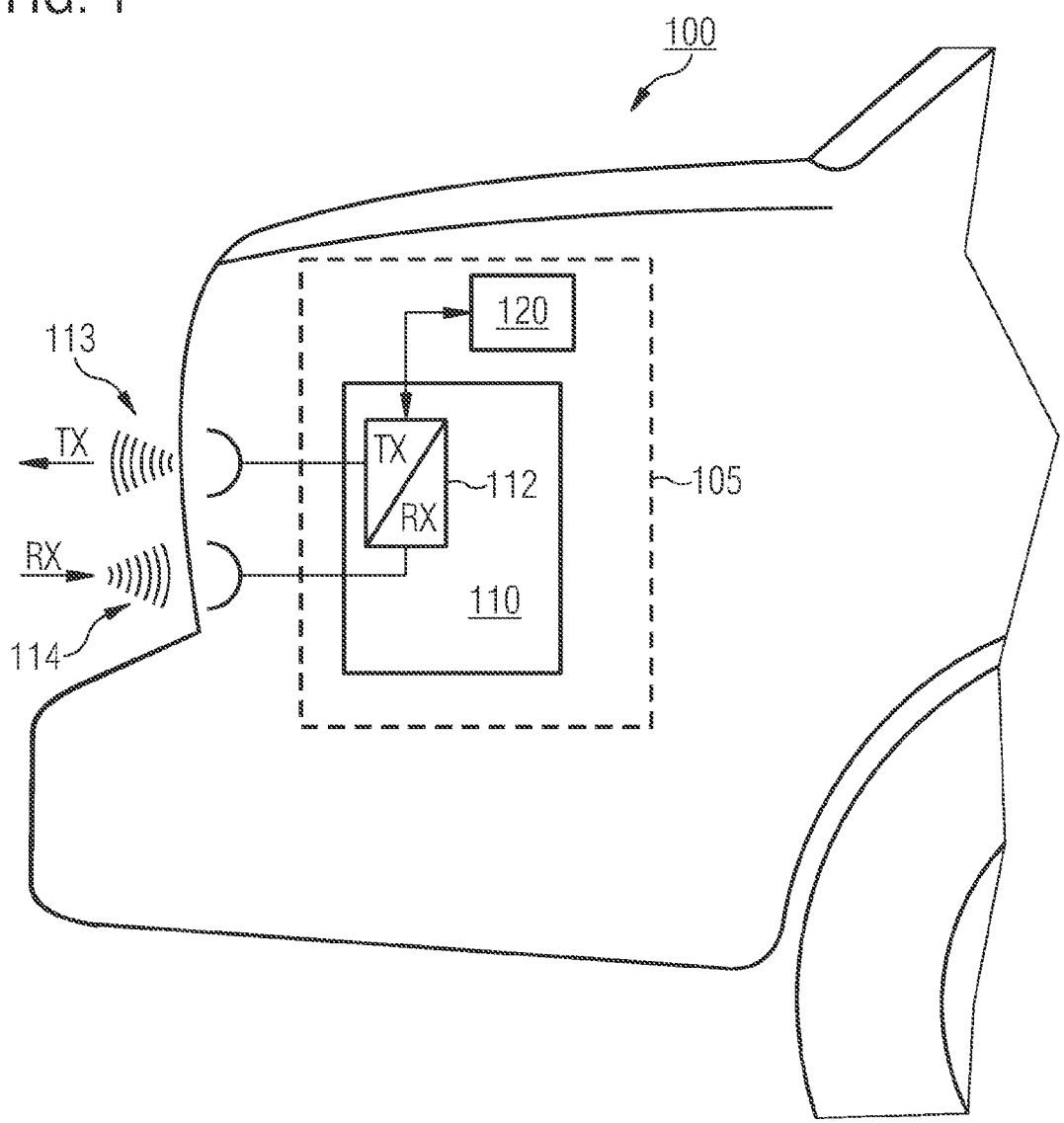
FIG. 1 illustrates a portion of a motor vehicle comprising a Car2X communication device according to an embodiment.

Various example embodiments will now be described more fully with reference to the accompanying drawings in which some example embodiments are illustrated.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers can refer to like or similar elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Furthermore, example embodiments, or at least parts thereof, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary acts. As disclosed herein, the term "storage medium", "storage unit" or "computer readable' storage medium" may represent one or more devices for storing data, including read only memory (ROM), random access memory (RAM), magnetic RAM, core memory, magnetic disk storage mediums, optical storage mediums, flash memory devices and or other tangible machine readable mediums for storing information. The term "computer-readable medium" may include, but is not limited to portable or fixed storage devices, optical storage devices, and various other mediums capable of storing, containing or carrying instruction(s) and/or data.

Turning now to FIG. 1, it is schematically shown a portion of a motor vehicle 100. Motor vehicle 100 comprises an apparatus 105 for communicating between the motor vehicle 100 and a remote device (not shown). Apparatus 105 comprises distance control circuitry 110 including at least one transceiver 112. Note that various implementations of transceiver 112 are possible. In some embodiments, a transmitter and a receiver portion of transceiver 112 may be combined and may share common circuitry or a single housing. In other embodiments, the transmitter and receiver portion of transceiver 112 may be implemented on separate circuitries and/or in separate housings.

Distance control circuitry 110 is configured to transmit and receive wireless distance control signals 113, 114. Various distance control signals are possible, such as, for example, radar signals, lidar signals, or ultrasonic signals. For explanatory purposes only, the following description will mainly refer to radar signals as distance control signals, and particularly to FMCW radar signals. The person having benefit from the present disclosure will appreciate, however, that embodiments are not limited to FMCW radar signals. Other forms of radar signals can be applied as well without departing from the principles of the present disclosure. The principles are likewise applicable to other wireless distance control systems, such as lidar or ultrasonic systems.

Based on a transmitted distance control signal 113 and a received distance control signal 114 reflected by the remote device, distance control circuitry 110 is further configured to detect a distance (and/or speed) between the motor vehicle 100 and the remote device. According to embodiments, apparatus 105 further comprises communication circuitry 120 coupled to transceiver 112 and configured to modulate user data onto a transmitted distance control signal 113 and/or to extract user data from a distance control signal received from said remote device or another remote device operable for Car2X communication. In some embodiments, communication circuitry 120 may be configured to modulate a phase and/or amplitude of the transmitted distance control signal based on the user data and/or to demodulate the phase and/or amplitude of the received distance control signal to extract the user data. In some embodiments, communication circuitry 120 may comprise digital and/or analog baseband signal processing circuitry to provide the user data in form of baseband signals.

Some present vehicles use radar systems to locate objects (people, other vehicles, roadside, etc.). Current radar systems for such purposes comprise a transmitter and a receiver, and may operate at high frequencies. Some examples operate at frequencies in the K-Band, for example around 24 GHz or 77 GHz. In a radar system, a receiver portion may be used to evaluate signals transmitted from its associated transmitter portion, usually by reflection from a remote target. This is schematically illustrated in FIG. 2.

Figure 2:
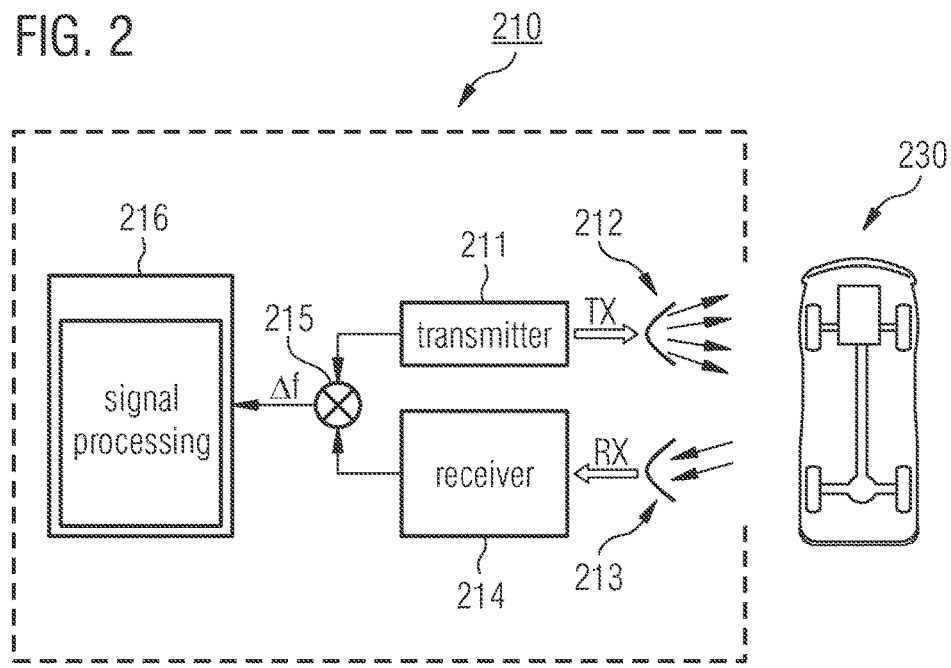
FIG. 2 shows a block diagram of a conventional FMCW radar system.

FIG. 2 shows a high-level block diagram of an example FMCW radar system 210 as an example implementation of distance control circuitry 110 for determining distance and/or speed with respect to a remote target 230.

FMCW radar system 210 includes RF transmitter circuitry 211, RF receiver circuitry 214 and signal processing circuitry 216. Note again that transmitter circuitry 211 and receiver circuitry 214 may share common digital and/or analog circuitry or a single housing or may be implemented on separate circuitries and/or in separate housings. Transmitter circuitry 211 generates a FMCW radar transmit signal used as distance control transmit signal. In some embodiments, the FMCW radar signal may vary in frequency in the range from 77 to 78 GHz, for example. Other frequencies are of course also possible. The FMCW radar transmit signal is emitted or transmitted towards target 230 via at least one transmit antenna 212. At target 230 the FMCW radar transmit signal is reflected and received via at least one receive antenna 213. The received reflected radar signal may more generally also be referred to as received distance control signal. Mixer 215 receives the radar transmit signal and the received reflected radar signal as inputs and produces a (baseband) signal indicative of the frequency difference $\Delta f$ between the two input signals as output signal. The output signal is fed to signal processing circuitry 216 to determine the distance from FMCW radar system 210 (which may be implemented in vehicle 100) to target 230. The higher $\Delta f$ the larger the distance to target 230.

The principle functioning of FMCW radar will now be explained in more detail with reference to FIG. 3.

In a FMCW radar system the radar transmit signal of a known stable frequency continuous wave varies up and down in frequency f within a predefined bandwidth and over a fixed period of time by a modulating signal. The bandwidth of frequency variation effects the resolution of the radar. Examples for the bandwidth range from a few hundred MHz to a few GHz. While the left portion of FIG. 3 shows a sawtooth wave as an example of the modulating signal, a variety of other modulations is possible. For example, the transmitter frequency can slew up and down according to a sine wave, a square wave, or a triangle wave, as shown in the right portion of FIG. 3.

Figure 3:
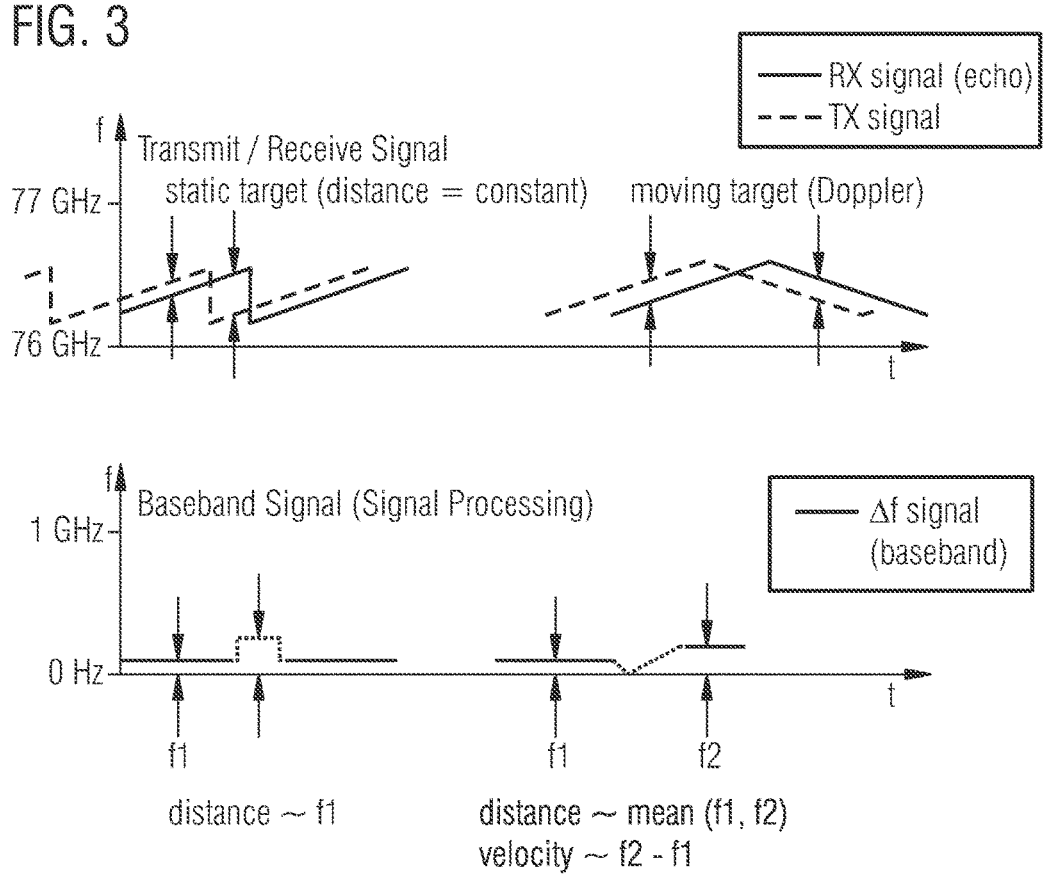
FIG. 3 illustrates the FMCW radar principle.

While the left portion of FIG. 3 illustrates an example with static target (hence no Doppler effect), the right portion of FIG. 3 shows an example with moving target, where return frequencies are shifted away from the transmitted frequency based on the Doppler effect when objects are moving. During the rising edge of the triangular frequency ramp, the frequency f increases and thus reduces the magnitude of difference frequency $f_1$. Due to superposition with the Doppler frequency, the frequency difference $f_1$ is lower on the rising edge of the triangular modulation when measured during a relative approximation between vehicle 100 and target 230. On the falling edge frequency difference $f_2$ is larger by the same amount compared to a static reflector. The average of the frequency differences $f_1$ and $f_2$ between the two measurement periods (rising and falling edge) is proportional to the distance, regardless of the speed. The difference $f_2-f_1$ of the frequency differences is proportional to the relative speed or velocity of the target 230.

Typically, a plurality of consecutive frequency ramps form a so-called ramp sequence and allows to detect a temporal course of distance and thus a relative speed or velocity. The skilled person having benefit from the present disclosure will appreciate that it is possible to employ a plurality of transmit and/or receive antennas (antenna array) for spatial or directional processing of transmit and/or receive signals. In this way it is possible to determine in which direction the target 230 is located. After a ramp sequence, the transmission of distance control signals may be paused to reduce power consumption and heating of the transceiver equipment. That is to say, some FMCW radars may emit a ramp sequence followed by a pause, then another ramp sequence followed by another pause, and so on. Thus, a FMCW may comprise a sequence of consecutive ramp sequences, wherein two subsequent ramp sequences are interrupted by a pause.

In some embodiments, phase modulation can be applied to the distance control transmit signal (e.g., FMCW radar transmit signal) to separate the own distance control system from others. In case of FMCW radar signals the continuous wave may hence be both frequency and phase modulated, leading to phase modulated FMCW ramps.

Conventionally, the modulating signal (e.g. sine, square, sawtooth, triangle) does not carry any user data or useful information. Embodiments propose, however, to convey useful information or user data via the modulating signal. For this purpose, some embodiments propose a distance (and/or speed) detection period and a data communication period. In particular, distance control circuitry 110, 210 may be configured to detect the distance to a remote object during the distance detection period. Communication circuitry 120 may be configured to modulate user data onto a transmitted distance control signal and/or to extract user data from a distance control signal received from a remote device during the data communication period. Correspondingly, the distance control signal may comprise a distance detection signal portion/section and a data communication signal portion/section. Depending on the underlying distance control technology, the distance detection period and the data communication period may be overlapping or non-overlapping time periods. In the example of FMCW radar signals, it may be advantageous to arrange the distance detection period and the data communication period in a non-overlapping manner. Likewise, the distance detection signal portion and the data communication signal portion may be overlapping or non-overlapping signal portions. An example is illustrated in FIG. 4.

Figure 4:
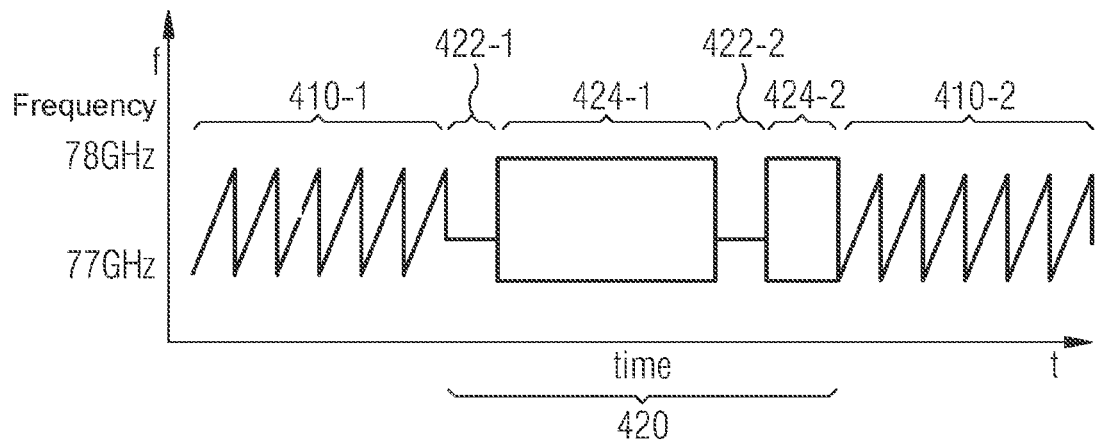
FIG. 4 shows an example of alternating distance detection periods and data communication periods.

The example of FIG. 4 shows a first distance detection period 410-1 including a first distance detection signal portion. Here, the first distance detection signal portion comprises a first FMCW (sawtooth) ramp sequence. A subsequent second distance detection period 410-2 includes a second distance detection signal portion. Here, the second distance detection signal portion comprises a second FMCW (sawtooth) ramp sequence. The two distance detection periods 410-1 and 410-2 are separated by a data communication period 420 arranged in between the distance detection periods 410-1 and 410-2. The data communication period 420 temporally corresponds to a data communication signal portion. In the illustrated example, distance detection period 410 and data communication period 420 (and hence the corresponding signal portions) are arranged in a time multiplexed manner.

As can further be seen from FIG. 4, data communication period 420 may comprise one or more data transmission periods 422 (and thus corresponding data transmission signal portions) and one or more data reception periods 424 (and corresponding data reception signal portions). As can be seen, the data transmission period(s) 422 and the data reception period(s) 424 can have different durations. In the illustrated example, the data transmission periods 422 and the data reception periods 424 are temporally non-overlapping time periods. That is to say, the data transmission periods 422 and the data reception periods 424 are arranged in a time multiplexed manner within data communication period 420. The skilled person having benefit from the present disclosure will appreciate that other configurations are possible as well, in particular, if transceivers capable of full duplex operation are used.

In the illustrated example embodiment, communication circuitry 120 is configured to modulate the user data onto the transmitted distance control signal during data communication period 420 between subsequent FMCW ramps of the transmitted distance control signal to obtain a data transmission signal portion. Likewise, communication circuitry 120 is configured to extract the user data from the distance control signal (or a data reception signal portion thereof) received from a remote device during data communication period 420 between subsequent FMCW ramps of the received distance control signal.

In the illustrated example, a constant single carrier frequency $f_{const}$ is used during data communication period 420 after the FMCW frequency ramp sequence of distance detection period 410-1. Thus, transceiver 112 may be configured to transmit and/or receive the distance control signal with a constant predefined frequency during communication period 420. The constant frequency $f_{const}$ should be agreed upon and thus known by both transmitting and receiving devices.

In an example embodiment, the phase of the constant frequency distance control signal may be modulated in accordance with the user data to be transmitted during a data transmission period 422. In some embodiments, digital phase modulation techniques, such as Phase Shift Keying (PSK), may be used. The skilled person having benefit from the present disclosure will appreciate that additional or alternative modulation techniques may be employed, such as amplitude modulation, for example. Embodiments employing both phase and amplitude modulation may be implemented using Quadrature Amplitude Modulation (QAM) techniques, for example.

After transmission of user data during transmission period 422, transmit amplifiers may be turned off for reception of user data from a remote device (e.g. a remote vehicle) during data reception period 424. Mixer circuitry can use a single predefined constant receive frequency to obtain a phase-modulated baseband signal carrying the user data. The user data may for example comprise a position of the own vehicle, speed, direction, status messages, warnings, etc. Arbitrary messages are possible. Note that a predefined constant receive frequency used during data reception period 424 may be different from a predefined constant transmit frequency used during data transmission period 422 in some embodiments.

To accommodate a plurality of different transmitting and receiving devices, communication circuitry 120 can be configured to communicate with a remote device in accordance with a predefined multiple access method, such as TDMA, FDMA, CDMA, or combinations thereof.

For example, if many senders and receivers are present concurrently and in each other's vicinity, the relationship 'overall message duration' versus 'receive pauses' could be chosen very small. Additionally or alternatively, a temporally driven protocol could be used for alignment and/or synchronization and to avoid collisions.

To increase spatial directivity and/or to enable spatially separate wireless communication channels (i.e., increased spatial diversity) some embodiments may employ an antenna array coupled to the at least one transceiver 112. Different antenna elements of the antenna array may be arranged at adequate locations of a motor vehicle (e.g. front, back, side, top), depending on the application. In some embodiments, one transceiver may drive multiple antenna elements. In other embodiments, each antenna element may have associated therewith one transceiver device. In particular the latter case may go beyond beamforming, since even spatially separate and independent communication channels to potentially different and spatially separate destinations may be established.

Figure 5:
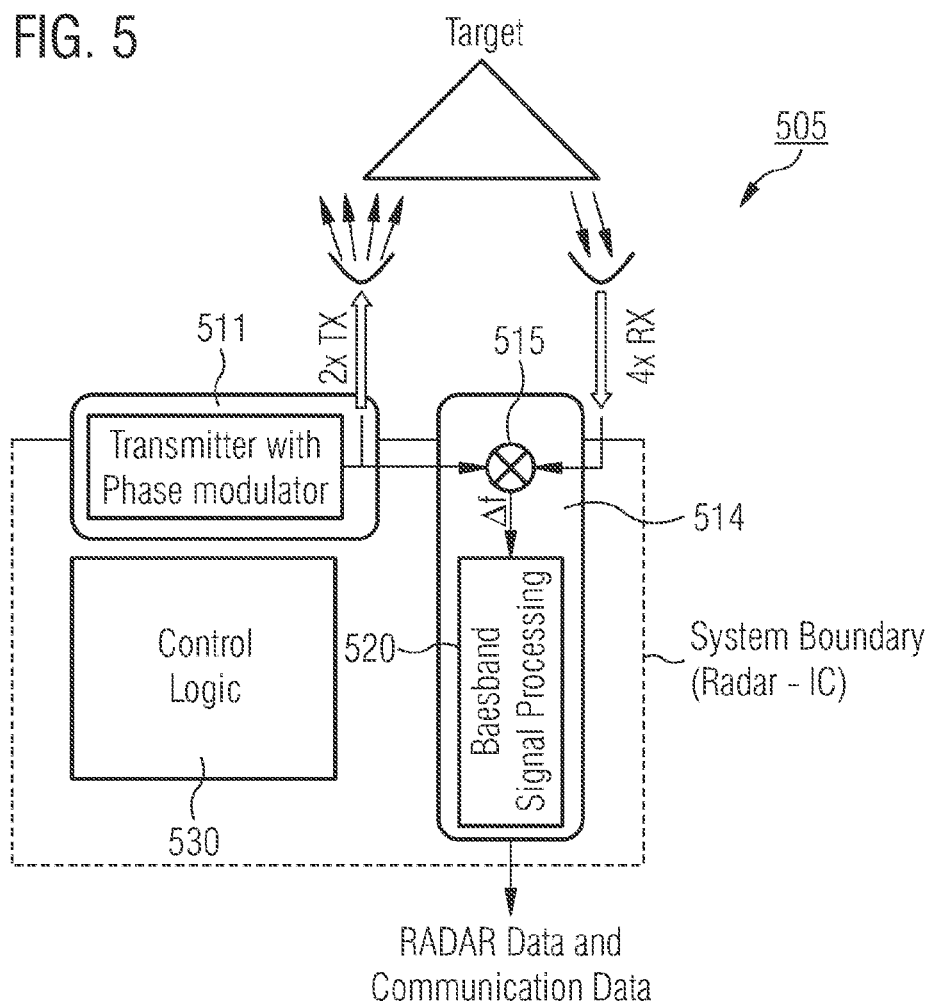
FIG. 5 shows a block diagram of modified FMCW radar system according to an embodiment.

FIG. 5 illustrates a block diagram of an FMCW radar Integrated Circuit (IC) 505 with communication capabilities according to an example embodiment. The FMCW radar IC may be applied for distance control as well as Car2X communication in vehicles.

IC 505 comprises a TX block 511 including a transmitter portion together with a phase modulator. The skilled person having benefit from the present disclosure will appreciate that TX block 511 may include hardware such as one or more digital baseband processors for generating modulating signals, one or more Digital-to-Analog Converters (DACs), one or more Local Oscillators (LOs), one or more Power Amplifiers (PAs), etc. TX block 511 is coupled to two transmit antennas in this example. During distance detection periods, TX block 511 may generate an FMCW radar signal, potentially with user specific phase modulation in order to separate different FMCW radar signals from different users. During communication periods, TX block 511 may generate a constant frequency RF signal which is phase modulated in accordance with user data or payload data to be transmitted. IC 505 also comprises a receive portion 514 and a baseband signal processing block 520. The skilled person having benefit from the present disclosure will appreciate that receive portion 514 may include hardware such as one or more Low-Noise Amplifiers (LNAs), one or more mixers 515, one or more Analog-to-Digital Converters (ADCs), etc. The receive portion 514 is coupled to four receive antennas in this example. Mixer 515 is used to down-convert received RF signals to the baseband domain with a reference signal. During distance detection periods, this reference signal is the FMCW radar transmit signal and baseband signal processing block 520 may determine distance and/or speed information. During communication periods, the reference signal is the constant frequency signal and baseband signal processing block 520 may determine received user data. Control logic 530 may enable switching between distance detection periods and communication periods as well as between data transmission periods and data reception periods.

The skilled person having benefit from the present disclosure will appreciate that example apparatuses described herein can perform respective methods. A generic flowchart of a method 600 that can be used for Car2X communication is shown in FIG. 6.

Method 600 includes two periods: a distance detection period and a data communication period. During a distance detection period, method 600 includes detecting 610 a distance between a first device, for example a motor vehicle, and a remote object based on a transmitted distance control transmit signal and a received distance control signal reflected by the remote object. During data communication period, method 600 includes modulating 620 user data onto the distance control transmit signal and/or receiving 630 a distance control transmit signal from a remote second device. In an act 630 user data is also extracted from the received distance control transmit signal of the second device.

To summarize, some embodiments of the present disclosure propose employing distance control systems (e.g. radar systems) also for data communication purposes, such as Car2X. Some embodiments make use of antenna arrays and/or directional antenna patterns for directional and/or selective connections. Thus, interference may be mitigated. Further, a plurality of spatially separate communication channels may be employed and dynamically adapted to a given environment.

The proposed Car2X concept may come without additional hardware components. Further, it can be employed with stationary communication infrastructure and in remote rural areas. Local coverage with radiuses of more than 200 m may be achieved. In addition to communication the communication partner may also be located with high accuracy. The resources used for communication are used for distance control purposes. Thus, no new signal spectra have to be allocated. Further, due to the possibility of accurate localization of the communication partner, embodiments can be advantageously employed in scenarios where vehicle location is essential. Some examples are the payment of toll fees at toll-collect barriers and the payment of parking fees at parking lot barriers. Another application could be the ordering process in fast-food restaurants, for example.

The description and drawings merely illustrate the principles of the disclosure. It will thus be appreciated that those skilled in the art will be able to devise various arrangements that, although not explicitly described or shown herein, embody the principles of the disclosure. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. An apparatus for communicating between a first device and a second device, comprising:
   distance control circuitry comprising at least one transceiver configured to transmit and receive distance control signals and to detect a distance between the first device and a remote object based on a first transmitted distance control signal and a first received distance control signal reflected by the remote object; and
   communication circuitry coupled to the transceiver and configured to modulate first user data of the first device onto a second transmitted distance control signal, and to extract second user data from a second received distance control signal received from the second device.

2. The apparatus of claim 1, wherein the distance control circuitry is configured to detect the distance during a distance detection period, and the communication circuitry is configured to modulate the first user data and extract the second user data during a data communication period.

3. The apparatus of claim 2, wherein the distance detection period and the data communication period are non-overlapping time periods.

4. The apparatus of claim 2, wherein the data communication period comprises a data transmission period and a data reception period.

5. The apparatus of claim 4, wherein the data transmission period and the data reception period are non-overlapping time periods.

6. The apparatus of claim 2, wherein the data communication period is arranged between two consecutive distance detection periods.

7. The apparatus of claim 1, wherein the second device is a remote device, and the communication circuitry is configured to communicate with the remote device in accordance with a predefined multiple access method.

8. The apparatus of claim 1, wherein the transceiver is configured to transmit the distance control signal as a single carrier signal.

9. The apparatus of claim 1, wherein the distance control circuitry is configured to use the distance control signals from the group selected from radar signals, lidar signals, and ultrasonic signals.

10. The apparatus of claim 1, wherein the transceiver is configured as a Frequency Modulated Continuous Wave (FMCW) radar transceiver to use FMCW radar signals, comprising a plurality of FMCW ramp sequences, as the distance control signals.

11. The apparatus of claim 1, wherein the communication circuitry is configured to modulate a phase or an amplitude of the second transmitted distance control signal based on the first user data and to demodulate a phase or an amplitude of the second received distance control signal to extract the second user data.

12. The apparatus of claim 10, wherein the second transmitted distance control signal comprises a first plurality of FMCW ramp sequences, the second received distance control signal comprises a second plurality of FMCW ramp sequences, and
   the communication circuitry is configured to modulate the first user data of the first device onto the second transmitted distance control signal during a data communication period between two consecutive FMCW ramp sequences of the second transmitted distance control signal, and configured to extract the second user data from the second received distance control signal received from the second device during a data communication period between two consecutive FMCW ramp sequences of the second received distance control signal.

13. The apparatus of claim 12, wherein the transceiver is configured to transmit the second transmitted distance control signal and receive the second received distance control signal with a constant predefined frequency during the communication period.

14. The apparatus of claim 1, further comprising:
an antenna array coupled to the at least one transceiver for directional signal transmission or reception.

15. A motor vehicle, comprising:
distance control circuitry comprising at least one transceiver configured to transmit and receive Frequency Modulated Continuous Wave (FMCW) radar signals as distance control signals and to detect a distance between the motor vehicle and a remote object based on a first transmitted distance control signal and a first received distance control signal reflected by the remote object; and
communication circuitry coupled to the transceiver and configured to modulate first user data onto a second transmitted distance control signal during a first data communication period between two consecutive FMCW ramp sequences of the second transmitted distance control signal, and configured to extract second user data from a second received distance control signal received from a remote device during a second data communication period between two consecutive FMCW ramp sequences of the second received distance control signal.

16. A method for Car2X communication, comprising:
detecting, during a distance detection period, a distance between a motor vehicle and a remote object based on a first distance control transmit signal and a first distance control receive signal reflected by the remote object; and
during data communication period:
modulating first user data onto the first distance control transmit signal;
and
receiving a second distance control transmit signal from a remote device and extracting second user data from the received second distance control transmit signal of the remote device.

17. The method of claim 16, wherein detecting the distance comprises using a first Frequency Modulated Continuous Wave (FMCW) radar signal comprising a first plurality of FMCW ramp sequences as the first distance control transmit signal, and
wherein the received second distance control transmit signal is a second FMCW radar signal comprising a second plurality of FMCW ramp sequences.

18. The method of claim 17, wherein:
modulating comprises modulating the first user data onto the first distance control transmit signal during a data transmission period between two consecutive FMCW frequency ramp sequences of the first distance control transmit signal, and
extracting comprises extracting the second user data from the second distance control transmit signal received from the remote device during a data reception period between two consecutive FMCW frequency ramp sequences of the received second distance control transmit signal received from the remote device.

19. The method of claim 18, further comprising transmitting the distance control transmit signal and receiving the distance control transmit signal received from the remote device using a predefined and constant single frequency.

* * * * *